May 8, 1923.

J. H. RAND

RECORD DEVICE

Filed May 2, 1921     2 Sheets-Sheet 1

1,454,405

May 8, 1923.
J. H. RAND
RECORD DEVICE
Filed May 2, 1921
1,454,405
2 Sheets-Sheet 2
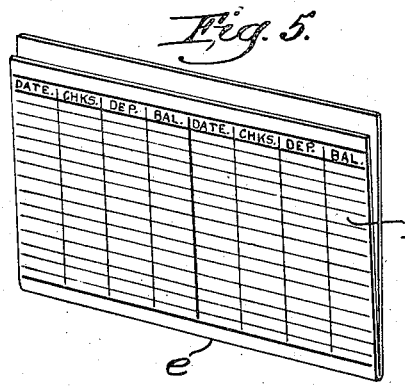
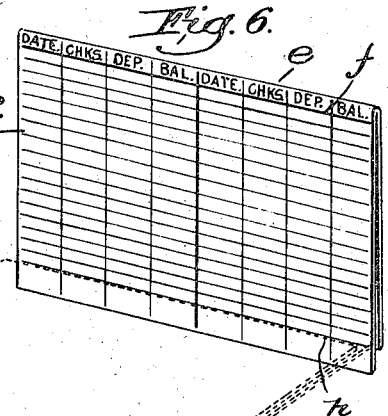
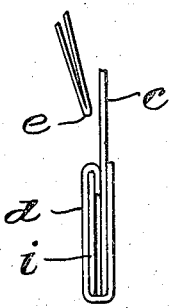
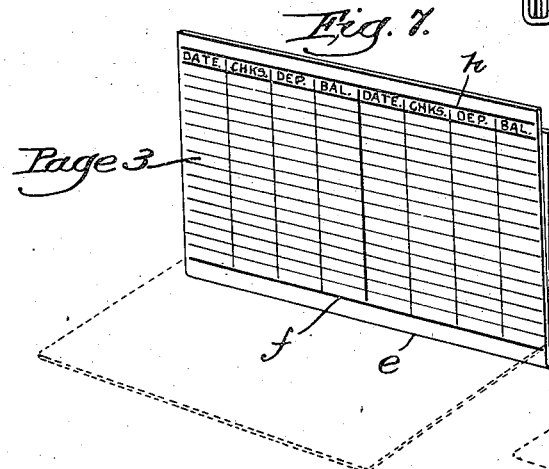
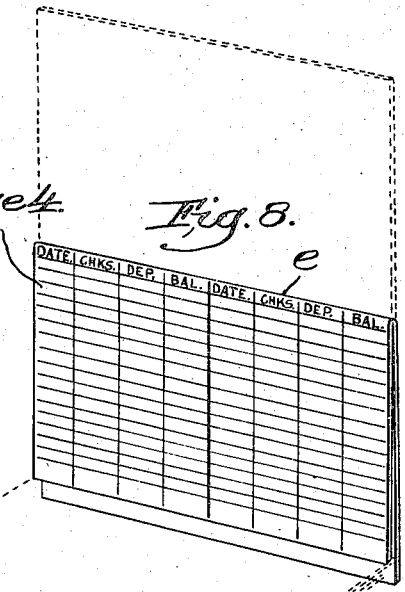

Patented May 8, 1923.

1,454,405

UNITED STATES PATENT OFFICE.

JAMES H. RAND, OF NORTH TONAWANDA, NEW YORK.

RECORD DEVICE.

Application filed May 2, 1921. Serial No. 466,134.

*To all whom it may concern:*

Be it known that I, JAMES H. RAND, citizen of the United States of America, and resident of North Tonawanda, in the county of Niagara and State of New York, have invented new and useful Improvements in Record Devices, of which the following is a specification.

This invention relates to a record device particularly designed for use in index holders of the visible index type, employing holders arranged in overlapped, spaced relation, with their free margins exposed; and its principal object is to provide in combination with such holders a removable record sheet constructed to form a number of leaves each presenting two pages, such that the several pages contained in the sheet may be successively displayed at the front, when the folded sheet is mounted in the holder in various positions, and in whatever one of its successive positions the folded sheet is placed in the holder all pages of the series, preceding the page displayed in front, may be readily exposed to view by swinging the leaves relatively to the holder without removing the record sheet from the holder. Thus a record sheet is provided of substantially greater capacity than the single cards or sheets heretofore used for similar purposes, and one in which all the entries, although contained on different and normally concealed pages, are immediately and readily available to the user for inspection or notation, without removing the sheet from the holder.

In the accompanying drawings which illustrate a preferred embodiment of the invention,—

Figure 1 is a front elevation of the holder with the record sheet mounted therein, in the position herein called position No. 1;

Fig. 2 is an obverse view of the record sheet unfolded;

Fig. 3 is a reverse view of the record sheet unfolded;

Fig. 4 is a detail in edge view illustrating the mode of inserting the record sheet into the holder;

Fig. 5 is a perspective view of the folded record sheet in position No. 1;

Fig. 6 is a perspective view of the folded record sheet in position No. 2;

Fig. 7 is a perspective view of the folded record sheet in position No. 3; and

Fig. 8 is a perspective view of the folded record sheet in position No. 4.

The holder may be of usual and well known construction, and as herein shown consists of a bar $a$, the ends of which are engaged and held by the flanges $b$, $b$, of a sheet metal frame of usual form, and a depending card $c$ hinged at its upper edge to the bar $a$ and provided at its lower edge with a lip or sheath $d$ made of transparent sheet celluloid or the like for holding the record sheet. As the holder and frame in and of themselves constitute no part of the present invention, and as they are well known in the art, a more detailed description of them will not be necessary. It will be understood that a series of similar holders, each with its record sheet, will be mounted in the frame one above another in overlapped, spaced relation, so that the contents of any holder may be exposed for examination or for the making of entries by swinging the overlapping holders on their hinges upward and away from that one to which access is desired.

The record sheet, which is made of cardboard, paper or other suitable material, preferably of sufficient weight and stiffness to maintain its position in the holder, is divided into two leaves by a transverse hinge crease in the region of its middle, thus presenting four pages, indicated respectively on the drawings as "Page 1", "Page 2", "Page 3", and "Page 4". These pages may be ruled, entitled or otherwise marked or inscribed in a manner appropriate to the use to which the record sheet is to be put. Thus, by way of illustration and not of limitation, the sheet is shown in the drawings as ruled and inscribed for a daily balance ledger account for a depositor of a bank, with columns arranged for records of the dates, checks drawn, deposits made and the daily balances, the name of the depositor being shown at the head of "Page 1". It will be understood, however, that the device may be adapted to and used for various other purposes.

The sheet has a transverse crease or scoring $e$ dividing the sheet into two leaves. The scoring $e$ constitutes a double acting hinge on which the two leaves may be folded together in either direction. One of the resulting leaves contains pages 1 and 4, and the other contains pages 2 and 3. The latter leaf is longer than the other, considered vertically, by approximately the width of the retaining lip $d$ of the holder.

The longer leaf is also creased or scored at $f$ to form a hinge parallel and in close proximity to the hinge $e$, the narrow section $g$ intermediate the hinges $e$ and $f$ being preferably about the width of the lip $d$ of the holder.

The larger leaf containing pages 2 and 3 is similarly creased or scored at $h$ near its free margin which projects beyond the edge of the shorter leaf, to form another hinge $h$ spaced from the edge a distance approximately equal to the width of the lip $d$.

For position No. 1 the record sheet is folded on itself on hinge crease $e$ with "Page 1" at the front as shown in Fig. 5. The sheet is then mounted in the holder as shown in Fig. 1 by inserting the folded margin (see Fig. 4) under the lip $d$ of the holder with "Page 1" exposed for the making of entries or for inspection.

If desired an index strip $i$ bearing the name of the depositor, or other index inscription, may be inserted in the sheath $d$ in front of the record sheet.

When "Page 1" has been filled with entries the sheet is removed from the holder, and reversed top for bottom and front for rear, to the position shown in Fig. 6, while still folded on crease $e$. The lower margin of the front leaf is then inserted under the lip $d$ of the holder and the record sheet is in position No. 2 with "Page 2" exposed. In this position although "Page 2" is the active page, that is, the one in current use, it may often be necessary to refer back to the preceding records on "Page 1." This may be done by simply swinging the sheet forward on hinge crease $h$, without removing the sheet from the holder, to the position shown in dotted lines in Fig. 6, whereupon "Page 1" will be displayed right-side up.

It will be understood that where the frame stands vertically any tendency of the sheet to fall forward accidentally on its hinge $h$ will be obviated by the other overlapping holders and sheets mounted above it in the frame, and the same holds true for the other positions presently to be described. No such tendency exists when the frame is lying on its back or is inclined rearwardly.

After "Page 2" has been filled the sheet is again removed from the holder and is reversely folded on crease $e$ to bring "Page 3" to the outside and in front as shown in Fig. 7. The folded edge is then inserted under lip $d$ of the holder and the record sheet is in position No. 3 with "Page 3" exposed. While in this position with "Page 3" as the active page, if the user wishes to refer back to pages 1 or 2 the front leaf is swung forward on hinge crease $f$, without removing the sheet from the holder, to the position shown in dotted lines in Fig. 7, whereupon "Page 1" will be displayed on the front or exposed side of the rear leaf, and "Page 2" on the reverse side of the front leaf, both right-side up for inspection.

When "Page 3" has been filled the sheet is again removed from the holder and reversed top for bottom and front for rear to the position shown in Fig. 8, still folded on crease $e$.

The lower margin of the rear leaf is then inserted under lip $d$ of the holder and the record sheet is in position No. 4 with "Page 4" as the exposed or active page. If now, it be desired to refer back to "Page 3", this is done by swinging the record sheet forward and downward on hinge crease $f$, without removing the sheet from the holder, to the position shown in dotted lines at the bottom of Fig. 8, whereupon "Page 3" will be displayed right-side up; or if it be desired to refer to Pages 1 or 2, this is done by swinging the front leaf forward and upward on hinge crease $e$, without removing the sheet from the holder, to the position shown in dotted lines at the top of Fig. 8, whereupon Pages 1 and 2 will be displayed, both right-side up for inspection.

Thus in each of the four positions in which the record sheet is successively held with the "active" page, or the page for the time being in current use, normally exposed, the sheet may be so manipulated without removing it from the frame as to bring into view all the records previously made on all of the preceding pages, thus rendering the entire record readily and immediately available for reference whether on the normally exposed page or on a preceding page.

It will be observed that the hinge crease $e$ is double-acting so as to allow the leaves to be bent in both directions, to turn either pages 1 and 2, or pages 3 and 4 outermost, as desired. The hinge crease $h$ need be only a single-acting hinge as it has to bend only in one direction, namely, toward Page 2, and is used only in positions No. 2 and and No. 4 of the record sheet. The hinge crease $f$ is also a single-acting hinge as it is required to bend only in one direction, namely in the direction of page 3, and is used only in position No. 3 of the record sheet.

I claim:—

1. In combination, a record sheet transversely folded to form a plurality of sections hinged together, each section comprising two pages of a series of pages included in the entire sheet, and a holder adapted removably to support the folded record sheet in different positions which will respectively display successive pages in front, the parts being so organized and arranged that in each successive position of the sheet in the holder all pages of the series preceding the page displayed at the front may be exposed to view by swinging the sections relatively to the holder without removing the record sheet from the holder.

2. In combination, a record sheet transversely folded to form a plurality of sections hinged together, each section comprising two pages of a series of pages included in the entire sheet, and a holder having a lip adapted removably to engage a margin of the folded record sheet in different positions which will respectively display successive pages in front, the parts being so organized and arranged that in each successive position of the sheet in the holder all pages of the series preceding the page displayed at the front may be exposed to view by swinging the sections relatively to the margin engaged by the lip of the holder without removing the record sheet from the holder.

3. In combination, a record sheet comprising two leaves adapted to be folded together in either direction on a transverse hinge, and a holder having means to engage the folded margin of the sheet when folded in either direction, and to engage the free margin of the front leaf when the sheet is folded in one direction and the free margin of the rear leaf when the sheet is folded in the opposite direction.

4. In combination, a record sheet comprising two leaves adapted to be folded together in either direction on a transverse hinge, the free margin of one leaf projecting beyond the free edge of the other leaf, and a holder having means adapted to engage the folded margin with the shorter leaf in front when the sheet is folded on itself in one direction or to engage the free projecting margin of the longer leaf with the longer leaf in front when the sheet is folded in the same direction, or to engage the folded margin with the longer leaf in front when the sheet is folded on itself in the opposite direction, also to engage the free projecting margin of the longer leaf with the shorter leaf in front when the sheet is folded in the latter direction.

5. In combination, a record sheet comprising two leaves adapted to be folded together in either direction on a transverse hinge, one leaf being longer than the other and having a hinge crease parallel and in close proximity to the hinge connecting the two leaves, the free projecting margin of the longer leaf being also hinged to the body of the leaf, and a holder having means adapted to engage the folded margin with the shorter leaf in front when the sheet is folded on itself in one direction or to engage the free hinged margin of the longer leaf with the longer leaf in front when the sheet is folded in the same direction, or to engage the folded margin with the longer leaf in front when the sheet is folded on itself in the opposite direction, also to engage the free hinged margin of the longer leaf with the shorter leaf in front when the sheet is folded in the latter direction.

6. In combination, a record sheet comprising two leaves adapted to be folded together in either direction on a transverse hinge, one leaf containing pages 1 and 4 and the other leaf containing pages 2 and 3, the free margin of the leaf containing pages 2 and 3 projecting beyond the free edge of the other leaf, and a holder having means removably engaging the folded margin of the sheet when page 1 or page 3 is exposed in front, and removably engaging the free margin of the longer projecting leaf when page 2 or page 4 is exposed in front, whereby in each successive position of the folded sheet in the holder all pages of the series preceding the page displayed in front may be exposed to view by swinging the leaves relatively to the holder without removing the record sheet from the holder.

7. In combination, a record sheet comprising two leaves adapted to be folded together in either direction on a transverse hinge, one leaf containing pages 1 and 4 and the other leaf containing pages 2 and 3, the latter leaf having a hinge crease parallel and in close proximity to the hinge connecting the two leaves, the free margin of the leaf containing pages 2 and 3 projecting beyond the free edge of the other leaf and being hinged to the body of the leaf, and a holder having means adapted removably to engage the folded margin of the sheet when page 1 or page 3 is exposed in front, or removably to engage the free hinged margin of the longer projecting leaf when page 2 or page 4 is exposed in front, whereby in each successive position of the folded sheet in the holder all pages of the series preceding the page displayed in front may be exposed to view by swinging the leaves relatively to the holder without removing the record sheet from the holder.

8. In combination, a record sheet comprising two leaves hinged together on a double acting hinge crease $e$, one leaf being longer than the other and having a parallel hinge crease $f$ in close proximity to the hinge $e$, the free margin of the longer leaf projecting beyond the free edge of the shorter leaf and being hinged to the body of the leaf by a hinge crease $h$, and a holder having a lip adapted removably to engage the folded margin of the sheet with either the shorter or longer leaf in front and to permit the longer leaf to be swung forward on hinge $f$ when the longer leaf is in front, or to engage the free hinged margin of the longer leaf irrespective of which leaf is in front to permit the folded sheet to be swung forward on hinge $h$.

Signed by me at Boston, Mass., this 29th day of April, 1921.

JAMES H. RAND.